UNITED STATES PATENT OFFICE.

SOLOMON HALEY, OF LOS ANGELES, CALIFORNIA.

CORE COMPOUND.

No. 902,653.  Specification of Letters Patent.  Patented Nov. 3, 1908.

Application filed May 19, 1908. Serial No. 433,657.

*To all whom it may concern:*

Be it known that I, SOLOMON HALEY, a citizen of the United States, residing at Los Angeles, in the county of Los Angeles and State of California, have invented or discovered certain new and useful Improvements in Core Compounds, of which the following is a specification, reference being had therein to the accompanying drawings.

This invention relates to a compound to be used as a binder or adhesive in the manufacture of sand cores for foundry purposes.

Cores for use in metal founding are almost universally constructed of sand held together by a suitable binder or adhesive, and for the latter linseed oil is now generally used, this material having been found to be by far the most satisfactory of any heretofore discovered or devised for the purpose stated. A great objection to the use of linseed oil, however, is the relatively high cost of this material, and numerous attempts have therefore been made to employ other and less expensive substances as adhesive agents, but these substances have generally proved unsatisfactory on account of their chemical or physical action on the molten metal, their failure to bind together the sand of the core with sufficient rigidity, or their objectionable chemical changes when subjected to heat, either in the baking of the core or the subsequent operation of casting.

The object, therefore, of my invention is to provide a substance or compound for use in the manufacture of cores which shall have all the properties and advantages of linseed oil for the purpose stated, but which will be less expensive of production.

To this end my improved binder or adhesive is preferably compounded in substantially the following manner and of the following ingredients in substantially the proportions stated:—To one gallon of water is added one half pound of rosin and one quarter pound of glue, preferably fish glue. The mixture is well boiled, and thereafter, and while said mixture is still hot, is added to the same one half pound of dextrin and about one-quarter pound of lye, caustic-soda, or other suitable alkali, (preferably caustic-soda) the exact amount of said last-named ingredient being dependent upon the relatively acid or basic properties of the other ingredients employed, sufficient being used to give to the whole a substantially neutral reaction. The foregoing ingredients are now thoroughly stirred and then allowed to stand for about twenty-four hours, when the adhesive or artificial oil is ready for use.

In use I preferably mix one part of the compound above described with about fifteen or sixteen parts of sand, which may then be molded into cores and baked in the usual manner.

The foregoing compound has been found to possess substantially the same properties and advantages as, or being slightly superior to, linseed oil for the purpose stated, producing firm, hard cores having no injurious effects upon the metal in the process of casting, and costing, in its production, considerably less than the cost of linseed oil.

Having thus described my invention, I claim as new and desire to secure by Letters Patent:—

1. A core compound comprising water, rosin, glue, dextrin, and a suitable alkali, substantially in the proportions stated.

2. A core compound, comprising water, rosin, glue, dextrin, and caustic-soda, substantially in the proportions stated.

3. A core compound containing rosin, glue, and a suitable alkali, substantially in the proportions stated.

4. A core compound containing rosin, glue, and caustic-soda, substantially in the proportions stated.

5. A core compound containing rosin, dextrin, and a suitable alkali, substantially in the proportions stated.

6. A core compound containing rosin, dextrin, and caustic-soda, substantially in the proportions stated.

7. A core compound comprising a suitable liquid base containing rosin, glue, dextrin, and a suitable alkali, substantially in the proportions stated.

In testimony whereof I affix my signature, in presence of two witnesses.

SOLOMON HALEY.

Witnesses:
  MARY C. HALEY,
  SANDY BRUCE.